Oct. 17, 1939.                L. E. PORTER                2,176,148
                              VIBRATORY JACK
                           Filed Dec. 17, 1937
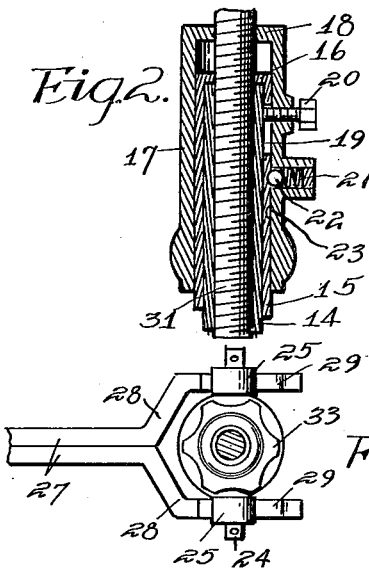
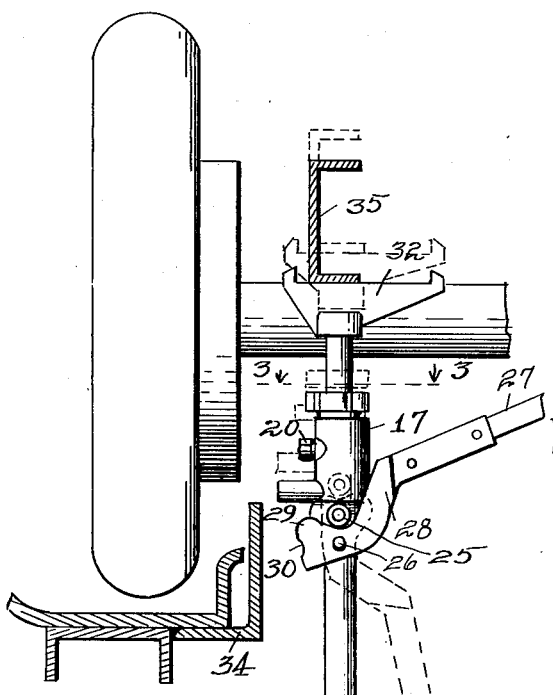
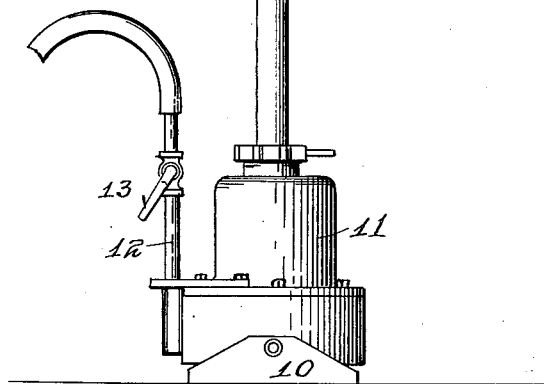
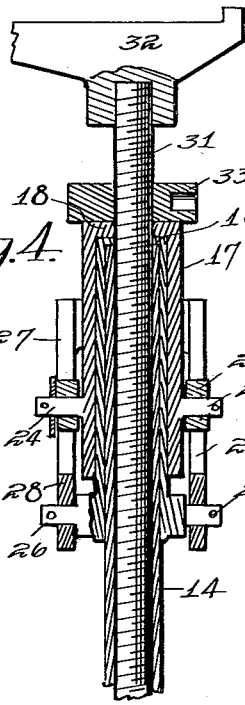
Inventor
Lewis E. Porter
by Owing & Hague Attys Patented Oct. 17, 1939

2,176,148

UNITED STATES PATENT OFFICE 2,176,148

VIBRATORY JACK

Lewis E. Porter, Philadelphia, Pa., assignor to Globe Hoist Company, Des Moines, Iowa, a corporation of Iowa Application December 17, 1937, Serial No. 180,365

1 Claim. (Cl. 73—51)

Jacks of this class are now in general use for the purpose of aiding operators in greasing automobiles, particularly the springs thereof, and the automobiles being serviced are usually held in elevated position upon an automobile lift. These jacks usually employ a motor driven by compressed air for imparting the desired vibrating movement.

The object of my invention is to provide a jack of this class of simple, durable and inexpensive construction, and which is designed to rest upon the floor so that it may be readily and easily moved to position for engaging any part of an automobile supported above the floor upon a lift.

More specifically, it is my object to provide a jack of this class which may be easily and quickly adjusted as to length so that it may be brought into engagement with the desired part of an automobile, and thereafter quickly and easily operated to elevate the adjacent portion of an automobile and securely hold it in such elevated position for convenience in greasing or servicing the automobile.

In the accompanying drawing—

Figure 1 shows a side elevation of my improved vibratory jack with portions of an automobile lift and automobile thereon; the dotted lines show the position of the jack and the part of the automobile shown when elevated by the lever;

Figure 2 shows an enlarged detail sectional view of the head member and sliding tubular member thereon;

Figure 3 shows an enlarged sectional view on the line 3—3 of Figure 1; and

Figure 4 shows an enlarged detail sectional view of the head and tubular sliding member taken from position at right angles to that shown in Figure 2 and illustrating the screw-threaded rod and automobile frame engaging bracket thereon.

Referring to the accompanying drawing I have used the reference numeral 10 to indicate a base member designed to rest upon a floor and having pivotally mounted therein a compressed air motor indicated generally by the reference numeral 11 and which is operated by compressed air through a pipe 12 controlled by manually operable valve 13. When the valve 13 is opened the motor vibrates up and down. This motor forms no part of my present invention, and such motors are in general use.

Mounted upon and fixed to the motor and base is a tubular upright supporting member 14. At the top of this supporting member is a tubular head 15 having at its top an inwardly extended flange 16. This tubular member is designed to receive the tubular upright 14, and said flange is designed to engage and rest upon the top of the tubular upright 14.

Slidingly mounted upon the exterior of the head 15 is a tubular member 17 having an inwardly extended flange 18 at its top to rest upon the flange 16 when at its lower limit of movement.

Formed in the head 15 is a vertical slot 19, and a screw 20 is seated in the tubular member 18 and projected into said slot for maintaining proper relative position between the head 15 and tubular member 17. A friction spring 21 is also carried by the tubular member 17 and serves to press a ball 22 against the outer surface of the head 15, which head is formed with a notch 23 to receive said ball when the tubular member is at its lower limit of movement to frictionally hold it in such position.

Formed on the outer surface of the tubular member 17 are two lugs 24 upon which are mounted rollers 25. Formed on the head 15 are two outwardly extended fulcrum members 26. A lever 27 is provided, and this lever has two arms 28. These arms are formed near their outer ends with cam-shaped surfaces 29, and beyond the cam-shaped surfaces are the notches 30. These cam-shaped surfaces are so shaped and proportioned that when the handle of the lever 27 is moved from its upper position, as shown by solid lines in Figure 1, to its lower position, as shown by dotted lines in said figure, the cam-shaped surfaces will engage the rollers 25 to thereby elevate the tubular member 17, and at the end of the elevating movement the rollers will enter the notches 30 and thereby the tubular member 17 will be supported in its elevated position, from which it may be moved by an upward movement of the lever. A screw-threaded rod 31 is slidingly extended through the head 15, the tubular member 17 and the upper end of the hollow upright 14, as shown in Figure 4. On the upper end of this screw is an automobile engaging bracket 32, and a nut 33 is mounted upon the screw 31 and engages the top of the sliding member 17. This screw is loosely mounted and is intended to be rotated by hand.

In Figure 1 I have shown a portion of an ordinary automobile lift which is indicated generally by the reference numeral 34, and I have shown a portion of an automobile frame indicated by the reference numeral 35.

In practical operation, and assuming that an automobile to be serviced was mounted upon an ordinary automobile lift in an elevated position, then if the operator desires to vibrate a portion of this automobile for the purpose of greasing the springs or the like, then he grasps the vibratory jack, which may be conveniently done by grasping the upright 14 which is normally supported in its upright position upon the floor by the base 10. He then moves the jack to any desired position with relation to the automobile, and since the jack is supported upon the floor and not upon any part of the automobile lift, the operator may place it at any desired position. When the jack has thus been placed, the operator simply rotates the hand nut 33 and turns it in the direction for elevating the bracket 32, and this is continued until the bracket 32 touches the automobile frame, and this may be done quickly and easily because the operator does not elevate the automobile frame by the manipulation of the nut 33. When this point is reached, the operator simply grasps the handle of the lever 27 and moves it downwardly. This will cause the cam-shaped surfaces 29 of the lever to engage the rollers 25 and thereby rapidly elevate the tubular member 17, the nut 33, and the bracket 32, and thereby the frame of the automobile will be elevated at the point where the jack is applied.

When it is desired to lower the automobile the operator again grasps the lever 27 and moves it upwardly, thus relieving all strain upon the nut 33 which may again be turned by hand to position for withdrawing the jack from the automobile.

I claim as my invention:

A vibratory jack comprising a base, a tubular upright carried by the base, means on said base for imparting a vibratory vertical movement of the tubular upright, a tubular head mounted upon the upper end of the tubular upright, fulcrum pins extended outwardly from opposite sides of the tubular head, a lever having two arms fulcrumed to said pins and being formed with cam surfaces and with notches, a tubular member slidingly mounted on the tubular head, two rollers mounted on opposite sides of the tubular member above and in vertical alignment with the said fulcrum pins and positioned to be engaged by said arms, an upright jack member extended through said tubular member and vertically movable relative thereto and supported by said tubular member when in various positions of its vertical movement.

LEWIS E. PORTER.